UNITED STATES PATENT OFFICE 2,483,853

MONOHYDROXY DINITRILES AND ESTERS THEREOF, AND PREPARATION OF THE SAME

Curtis W. Smith, Berkeley, and Seaver A. Ballard, Orinda, Calif., assignors to Shell Development Company, San Francisco, Calif., a corporation of Delaware No Drawing. Application April 7, 1947,
Serial No. 739,947

11 Claims. (Cl. 260—465.4)

This invention relates to a method of preparing acyl derivatives of monohydroxy dinitriles. More particularly, the present invention relates to a method of preparing acyl derivatives of the monohydroxy-1,5-alkanedinitriles which, if desired, may be further substituted at carbon atoms in the alkane residue; and from which, as desired, the corresponding free hydroxy dinitriles may be prepared in any convenient manner.

A further aspect of the present invention relates to certain of the monohydroxy dinitriles, and esters thereof, that may be prepared by the process of the invention, the novel compounds being characterized in part by the presence of the hydroxyl group, or its acyl derivative, bonded to a secondary aliphatic carbon atom which, in turn, is directly bonded to the carbon atom of one of the cyano groups.

One object of the present invention is the preparation of acyl derivatives of monohydroxy dinitriles and a method for preparing the same. Another object of the invention is a method for preparing monohydroxy dinitriles, or esters thereof, from diacyl derivatives of the 2-alkene-1,1-diols and of the 2-alkene-1,3-diols. A still further object of the invention comprises new and particularly valuable 2-hydroxy-1,5-alkanedinitriles, and acyl derivatives thereof, characterized, in part, by the presence of the hydroxy group, or an acyl derivative thereof, bonded to a secondary carbon atom which, in turn, is directly bonded to the carbon atom of one of the cyano groups.

These and related objects of the present invention have been accomplished by causing hydrogen cyanide to react with a diacyl derivative of an unsaturated diol in which both of the hydroxy groups are attached to a single carbon atom which is directly linked by a univalent bond to an olefinic carbon atom, or upon a compound or mixture of compounds convertible under the conditions of the reaction to a diacyl derivative of an unsaturated diol of the above-stated class. The reaction may be effected by mixing an alkali salt of hydrogen cyanide with the diacyl derivative of the unsaturated diol or with a material or mixture of materials convertible thereto under the reaction conditions, and maintaining the mixture at a suitable temperature for a time sufficient to bring about the desired reaction. After the reaction has been effected, the reaction mixture may be separated into its components in any suitable manner with separation of the acyl derivative of the hydroxy dinitrile that was formed by the reaction. If the free hydroxy dinitrile is desired as the ultimate product, the ester linkage may be hydrolyzed in any suitable manner leading to liberation of the free hydroxy dinitrile and the carboxylic acid from which the acyl group is derived.

The present invention is regarded as including, in its broadest aspects the conversion by reaction with hydrogen cyanide of diacyl derivatives of diols in which the two hydroxyl groups are attached to a saturated carbon atom which is directly linked via a univalent carbon-to-carbon bond to an olefinic carbon atom, to an acyl derivative of a monohydroxy dinitrile of the herein defined class. (It will, of course, be appreciated by those skilled in the art to which the present invention pertains, that many, if not all of the unsaturated free diols of the class referred to in the immediately preceding sentence have never been isolated in the pure state. However, in common with certain other "theoretical" organic compounds which also have never been isolated, e. g., carbamic acid, certain of their derivatives, such as their ester derivatives, are well known and easily isolatable. For purposes of convenience, the compounds which thus may be utilized in the process of the invention will be referred to at times herein as the diacyl derivatives of these "theoretical" dihydric alcohols. Other forms of nomenclature which could be used at times would include reference to the diacyl derivatives of the aliphatic diols within this class as 1,1-diacyloxy-2-alkenes, or, alternatively, as the 2-alkenylidene derivatives of the carboxylic acids.) The diacyl derivatives of diols to which the process of the invention may be applied, may be further defined as containing the structural unit

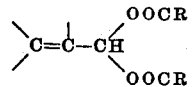

in which R stands for either the hydrogen atom or an organic group, such as a hydrocarbon group. The free valencies at the terminal olefinic carbon atom in the unit may be satisfied by attachment to separate atoms, or both the free valencies may be attached to one atom. The two R's may be the same or different. The free valencies of the structural unit may be satisfied by atoms of hydrogen bonded thereby, or they may be satisfied by organic groups, such as one or more aliphatic, cycloaliphatic, aromatic, or heterocyclic groups bonded thereby. The structural unit may form part of an alicyclic or heterocyclic ring structure, as when the olefinically bonded carbon atoms in the unit form part of an alicyclic or heterocyclic ring. From the standpoint of their availability and the low cost with which they may be prepared, a preferred class of diacyl derivatives of diols, which includes individual members particularly suited to objects of the present invention, may be defined by the structural formula

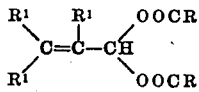

in which each $R^1$ represents a member of the group consisting of the hydrogen atom and the alkyl, aryl, alkaryl, aralkyl, and cycloalkyl radicals. The compounds within this more limited, preferred group include, among others, the diacyl derivatives of the following diols:

2-propene-1,1-diol
2-butene-1,1-diol
2-methyl-2-propene-1,1-diol
2-ethyl-2-propene-1,1-diol
2,3-dimethyl-2-butene-1,1-diol
2,3-diethyl-2-pentene-1,1-diol
2-hexene-1,1-diol
2-methyl-2-hexene-1,1-diol
2,3-diethyl-2-heptene-1,1-diol
2-phenyl-2-propene-1,1-diol
3-phenyl-2-propene-1,1-diol
2-methyl-4-phenyl-2-butene-1,1-diol
2-cyclohexyl-2-butene-1,1-diol
3-tolyl-2-propene-1,1-diol
2-methyl-4-xylyl-2-pentene-1,1-diol
2-benzyl-2-propene-1,1-diol
3-phenethyl-2-pentene-1,1-diol
3-cyclopentyl-2-butene-1,1-diol and the like and their homologs and their analogs. A particularly convenient group of diacyl derivatives of diols suited to the objects of the present invention comprises the diacyl derivatives of the 2-alkene-1,1-diols, or, in other words, the 2-alkenylidene derivatives of the carboxylic acids. The diacyl derivatives of the aliphatic 2-alkene-1,1-diols, such as of 2-propene-1,1-diol
2-methyl-2-propene-1,1-diol
2-butene-1,1-diol
2-methyl-2-butene-1,1-diol and their mono-olefinic, acyclic homologs constitute this most highly preferred group. Although the diacyl derivatives of the foregoing and analogous and homologous diols constitute preferred groups of compounds which may be converted to acyl derivatives of monohydroxy dinitriles in accordance with the process to which the invention relates, the invention is not to be construed as limited thereto in its broader applications. For example, additional diacyl derivatives of dihydric alcohols which contain the structural unit defined in a preceding formula include, among others, diacyl derivatives of the following diols:

3-tetrahydropyranyl-2-propene-1,1-diol
2-furfuryl-2-propene-1,1-diol
2,5-pentadiene-1,1-diol
2-furfuryl-2-propene-1,1-diol
3-(2-piperidyl)-2-propene-1,1-diol and analogous and homologous dihydric alcohols. It also will be appreciated that the hydrocarbon groups bonded by the free valencies in the above described structural unit may or may not contain substituent groups, which may include, for example, —OR, —O—OC—R, —halogen, —OC—R, —OC—NR$_2$, —O—, —S—, —NH, —SO$_2$—, etc. However, it generally is preferred to employ those compounds in which the hydrocarbon groups are unsubstituted hydrocarbon groups.

The present invention also includes the preparation of monohydroxy dinitriles from a compound or a mixture of compounds that will form under the conditions of the process a diacyl derivative of a diol that contains the above defined structural unit. One group of compounds which appears to be thus convertible to diacyl derivatives of these unsaturated diols includes the diesters which are isomeric to those described above and which contain the structural unit

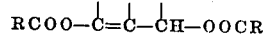

It has been observed that compounds containing this structural unit, are capable, upon treatment with an alkali cyanide according to the method of the invention, of forming monohydroxy dinitriles that are the same as the ones that would be obtained upon treatment of the diacyl derivatives of the isomeric 1,1-diols. While it is not desired to limit the invention according to any particular theory, it appears that under the conditions of the process the esters of these 1,3-diols may be led to isomerize to form the corresponding ester of a 1,1-diol which then reacts with hydrogen cyanide with resultant formation of the monoacyl derivative of a hydroxy dinitrile of the herein defined class. In view of these observations, and their possible theoretical explanation, the present invention is regarded as embracing the preparation of monohydroxy dinitriles, and ester derivatives thereof, from compounds which contain this last-given structural unit as well as from the diesters of the previously mentioned 1,1-diols. A preferred group of diesters of 1,3-diols which may be employed in the process of the invention, may be defined by the formula

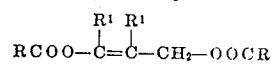

In this formula, R and $R^1$ have their previous significance. Within this more limited group of compounds, the diacyl derivatives of the 2-alkene-1,3-diols are particularly preferred. Other materials which may be employed as precursors of diacyl derivatives of 1,1-diols of the present class include, for example, esters of saturated, halogen-containing glycols which upon dehydrohalogenation would form the unsaturated diesters; compounds which can be caused to react under the conditions of the process to form in situ the unsaturated ester; etc.

The diacyl derivatives of 1,1-diols which are employed in the present process comprise the diesters of the hydrates of the alpha,beta-unsaturated aldehydes, particularly of the 2-alkenals. These esters may be prepared conveniently by treating the unsaturated aldehyde with a carboxylic acid anhydride to effect reaction therebetween according to the equation

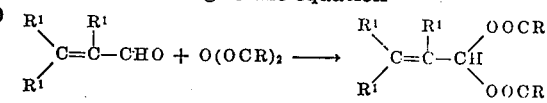

In this equation, R and $R^1$ may have their previous significance. In this equation, R preferably represents an aliphatic hydrocarbon group and $R^1$ preferably represents either the hydrogen atom or an aliphatic hydrocarbon group. The reaction may be effected by treating the unsaturated aldehyde with the carboxylic acid anhydride in the presence of an acidic condensation catalyst at a temperature between about 0° C. and about 20° C., or higher. Acidic condensation catalysts, such as sulfuric acid, phosphoric acid, oxalic acid, stannous chloride, zinc chloride, ferric chloride, etc., sulfuric acid being preferred, may be employed. The catalyst, if one is employed, may be used in amounts from about 0.1 per cent to about 5 per cent or more of the weight of the reactants. The diesters of the present unsaturated 1,1-diols also may be prepared by the interaction of a metal salt, such as a lead, silver, or sodium salt of a carboxylic acid with a suitable 2-alkenylidene dihalide, or by other known or special methods. The diesters of the herein disclosed unsaturated 1,3-diols likewise may be prepared by reacting a suitable dihalogen derivative of an unsaturated compound, such as a 1,3-dihalo-2-alkene, with a salt of a carboxylic acid or, less desirably for the purposes of the present invention because of the additional steps that eventually would be involved, by the isomerization of the corresponding 1,1-diester under the influence of an acid-reacting catalyst in accordance with the method of the copending application Serial No. 709,085, filed November 12, 1946, now abandoned.

The residual portion of the carboxylic acids, represented by R in the foregoing equations and formulas, may in accordance with the broadest concepts of the invention be derived from any of the various carboxylic acids known in the art. R thus may represent either the hydrogen atom, or it may represent an organic group such as alkyl, aryl, alkaryl, aralkyl, alkenyl, aralkenyl, alkenaryl, cycloalkyl, cycloalkenyl, or a heterocyclic group. Among the numerous diacyl derivatives of the foregoing unsaturated diols which may be employed in the process of the present invention, there are included, among others, the following: acetates, propionates, formates, butyrates, valerates, and derivatives wherein the acyl groups are derived from higher fatty acids, acrylates, methacrylates, crotonates, chloroacrylates, methoxyacrylates, ethoxymethacrylates, etc., and diacyl derivates wherein one or both of the acyl groups is/are derived from other carboxylic acids, including, among others, cyclohexanecarboxylic acid, cyclohexenecarboxylic acid, tetrahydropyran carboxylic acid, furoic acid, pentadienoic acid, mandelic acid, cumic acid, phenylacrylic acid, nicotinic acid, and the like. The two acyl groups may be derived from the same carboxylic acid or they may be derived from different carboxylic acids. If it is desired to prepare a particular acyl derivative of a monohydroxydinitrile, the diacyl derivative of the unsaturated diol will of course be selected accordingly. In the absence of other, controlling reasons, it generally is most economical and convenient to employ the diacyl derivatives in which the acyl groups are derived from a lower fatty acid, preferably acetic acid.

When a diacyl derivative of an unsaturated 1,1-diol of the herein defined character is reacted with hydrogen cyanide according to the method of the invention, the following reaction appears to take place

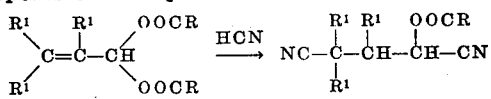

In this equation, R and $R^1$ have their previous significance. When another material, such as a diacyl derivative of one of the herein above mentioned isomeric 1,3-diols is caused to react with hydrogen cyanide according to the method of the invention, presumably the same reaction occurs, preceded by an initial conversion of the 1,3-derivative to the isomeric 1,1-derivative. It also is possible, however, that there occurs conversion of the 1,3-derivative to an as yet unidentified intermediate which may be formed by or during the reaction of both the 1,3- and the 1,1-derivatives with the hydrogen cyanide, and which reacts to form the final product. In view of the complexity of the possible intermediate reactions, it will be understood that it is not intended to limit the invention according to any particular theory concerning the nature of the intermediate reactions.

The foregoing reactions may be effected by mixing an alkali, e. g., a metal, salt of hydrogen cyanide with the diacyl derivative of an unsaturated 1,1-diol of the herein defined class or of an unsaturated 1,3-diol of the herein defined class, and maintaining the mixture at a suitable reaction temperature until appreciable reaction has occurred. Free hydrocyanic acid may be added to or included in the reaction mixture. Potassium cyanide is eminently satisfactory as the salt of hydrogen cyanide, although other salts thereof, including the sodium, silver, calcium, copper, mercuric, and equivalent salts, also may be employed. The reaction may be caused to take place by mixing the unsaturated diester with the solid metal cyanide in suitable proportions, and then heating or otherwise maintaining the mixture within a suitable range of temperatures for sufficient time. The reactants may be employed in various proportions. Either one may be present in amounts greater than those required according to theory, a generally suitable range comprising mole ratios of metal cyanide/unsaturated diester of from about 1/5 to about 20/1. The optimum yields of the desired acyl derivative of a monohydroxy dinitrile generally are favored by the presence of an excess of the alkali cyanide over the theoretical requirements, mole ratios of metal cyanide-unsaturated diester of from about 3/1 to about 10/1 thus being preferred. In certain cases it may be desirable to include in the reaction mixture an amount of an inert diluent, or solvent, such as inert organic solvent, to modify favorably the reaction. Depending upon the particular circumstances, the inert diluent may serve to reduce the reactive concentrations of the reactants thereby favoring control of the reaction. In other cases, the presence of a diluent may favor more intimate contact of the unsaturated diester with the alkali cyanide, as in those instances when the unsaturated diester may be a solid, or a liquid having low mobility. The presence of an inert diluent also may facilitate the removal of heat from the reaction mixture, as by reflux, and in the same manner it may be employed with advantage to regulate the temperature of the reaction mixture. Suitable diluents which thus may be employed include the liquid hydrocarbons, ethers, saturated esters, chlorinated hydrocarbons, and the like. Although the presence of a solvent, or diluent medium thus at times may favor the desired reaction or the manipulations by which it is effected, the use of a diluent is not to be construed as an essential feature of the present process. In many instances, as when normally liquid unsaturated diesters are employed, the process of the invention may be executed with very satisfactory outcome in the absence of any added inert solvent, or dispersing medium.

The present invention also embraces the use of a suitable catalyst to increase the rate of the reaction, although in this instance also the process frequently may be executed with entirely satisfactory results in the absence of any added material having catalytic activity. Among the substances which may be employed to modify or to favor the desired reaction are included acid-reacting materials, such as mineral acids, acid-reacting salts, organic acids, materials which will generate acids in situ, and the like. Basic materials also may be employed as catalysts, including amines, alkali metal alkalies, alkali metal carbonates, hydroxides and/or carbonates of the alkaline earth metals, etc.

After the initial mixing of the unsaturated diester with the alkali cyanide, and with the solvent medium and/or the catalyst if either or both are employed, the reaction may be initiated, if required, by heating the mixture to a moderately elevated temperature. The reaction is exothermic, and after it has started it may not be necessary to add further heat. Depending upon the size and the shape of the reaction vessel, and upon similar factors, the provision of suitable cooling means during at least the initial phases of the reaction may be desirable to prevent an excessive rise in the temperature of the reaction mixture. The reaction temperature is not highly critical, although the use of moderately elevated temperatures favors the desired reaction. Temperatures of from about 50° C. to about 200° C. are generally applicable, a preferred range being from about 75° C. to about 140° C. During the later stages of the reaction, heat may be supplied to the reaction mixture when and as necessary to maintain its temperature within a suitable range.

The process of the invention may be executed in any suitable type of apparatus and in any suitable manner. The alkali cyanide thus may be employed in the form of crystals, pellets, lumps, fragments, a powder or other pieces or particles of regular or irregular contours, or it may be dissolved in a solvent therefor. The alkali cyanide and the unsaturated diester may be introduced simultaneously or stepwise into a reaction vessel and the mixture maintained, with agitation, at the desired temperature until the reaction is complete. In another manner of executing the process, the unsaturated diester, dispersed in a solvent if desired, may be circulated over or percolated through a bed of solid metal cyanide under conditions which favor the reaction. After completion of the reaction, the desired product of the reaction may be recovered in any suitable manner. For example, the metal salt of the carboxylic acid formed in the reaction, and any excess metal cyanide that may be present, may be removed from the reaction mixture by filtration, by extraction of the organic constituents therefrom with selective solvents, or otherwise, and the organic portion of the mixture may be subjected to further purification to recover the desired product of the reaction. The organic portion of the mixture may be separated into its components by fractional distillation, by treatment with selective solvents, by crystallization, or other appropriate methods. Of course, if the acyl derivative of the hydroxy dinitrile is to be used in such a manner that its isolation is not required, the separation of the reaction mixture into its components may be modified or dispensed with according to the requirements of the intended use.

From a perusal of the foregoing disclosures, it will be apparent to those skilled in the art that acyl derivatives of a large number of monohydroxy dinitriles may be prepared according to the process of the present invention. It therefore will be understood that in its generic aspects the invention is regarded as including the preparation of these numerous compounds by a process comprising causing an alkali cyanide, $M(CN)_x$, M being a metal having a valence of $x$, preferably 1 or 2, to react upon a diacyl derivative of an unsaturated diol having the structure

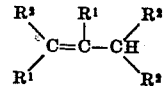

in which any two of the $R^2$'s represent acyloxy groups, including the formoxy group, and the other $R^2$ and the $R^1$'s represent members of the group consisting of the hydrogen atom and the unsubstituted and the substituted hydrocarbon radicals, to form thereby an acyl derivative of a monohydroxy dinitrile having the structure

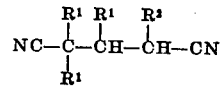

in which $R^2$ is an acyloxy group and $R^1$ has its above significance. The numerous compounds which thus may be prepared include highly useful compounds which are of particular value as chemical intermediates for the preparation of amines, of carboxylic acids, and of their derivatives. Compounds obtainable by the process of the present invention also include materials having value in the preparation of resins.

A most highly preferred group of unsaturated diesters which may be employed in the process of the invention for the preparation of acyl derivatives of monohydroxy dinitriles, comprises the acyl derivatives of the mono-olefinic, acyclic diols having structures represented by the formula

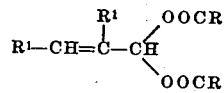

in which R has its previous significance and $R^1$ represents either the hydrogen atom or an alkyl group. When reactants selected from this preferred group are employed in the process of the invention, there may be obtained the particularly valuable derivatives of hydroxy dinitriles having structures represented by the formula

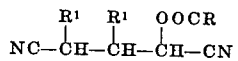

in which R has its previous significance and $R^1$ represents either the hydrogen atom or an alkyl group. This group includes, among others, the esters of the following hydroxy-dinitriles:

2-hydroxy-1,5-pentanedinitrile
2-hydroxy-3-methyl-1,5-pentanedinitrile
2-hydroxy-4-methyl-1,5-pentanedinitrile
2-hydroxy-3-ethyl-1,5-pentanedinitrile
2-hydroxy-3,4-dimethyl-1,5-pentanedinitrile
2-hydroxy-3-methyl-4-ethyl-1,5-pentanedinitrile
2-hydroxy-3-isopropyl-1,5-pentanedinitrile
2-hydroxy-3-butyl- 4 -methyl- 1,5 -pentanedinitrile
2-hydroxy-3-methyl-4-isopropyl- 1,5 -pentanedinitrile
2-hydroxy-3,4-diisopropyl-1,5-pentanedinitrile
2-hydroxy-3,4-di-t-butyl-1,5-pentanedinitrile
2-hydroxy- 3- ethyl-4-t-butyl- 1,5 -pentanedinitrile and the homologs thereof. Particular esters thereof include, among others, the fatty acid esters, the aromatic carboxylic acid esters, the unsaturated aliphatic carboxylic acid esters, the heterocyclic carboxylic acid esters, and the cycloaliphatic carboxylic acid esters, a preferred group of esters comprising the esters in which the acyl groups are derived from the saturated and the unsaturated aliphatic carboxylic acids. It has been found that in these compounds the attachment of the acyloxy group (or the hydroxyl group) to a secondary carbon atom which in turn is directly connected to the carbon atom of one of the cyano groups, renders the dinitriles defined by this structural formula of particular and improved value in numerous applications. Under certain conditions they may be caused to react as polyfunctional compounds which contain four functional groups or atoms. The polyfunctional characteristics of these compounds are desirably influenced and modified, presumably by the mutual influences of the several reactive groups and atoms upon each other. By virtue of these characteristics, and the ease and low cost with which they may be prepared by means of the present process, the members of this group may be expected to acquire a substantial field of applied utility in the commercial arts.

The following examples will serve to illustrate certain of the numerous possible specific embodiments of the invention. It will be appreciated that the examples are intended to illustrate the invention and not to limit unnecessarily its scope as it is defined in the hereto appended claims. In the examples, the parts are by weight.

Example I

Seventy-nine parts of 1,1-diacetoxy-2-propene (acrolein diacetate), were mixed with 130 parts of finely divided potassium cyanide in a suitable reaction vessel. The mixture was gradually heated to a temperature of about 110° C. whereupon an exothermic reaction ensued. The mixture was maintained, with agitation, at a temperature of 110° C. to 120° C. for about thirty minutes. Slight occasional cooling was required to maintain the temperature of the mixture within this range. After the thirty minute period the initially rapid reaction had slowed. The mixture was heated on a steam bath at about 100° C. for an additional hour. The reaction mixture was then cooled to room temperature and extracted with three 100 part portions of chloroform. The extract was distilled. After removal of the chloroform, the following fractions were collected:

A. Forecut, largely 1,1-diacetoxy-2-propene; 32 parts.
B. Fraction distilling 110° C. to 125° C., under 0.3 to 0.5 millimeters of mercury, including a heart cut of 13 parts collected at 124° C. under 0.3 to 0.5 millimeters mercury pressure; 17.1 parts.
C. Bottoms, mostly resinous; 15 parts.

The heart cut in fraction B was identified as the acetate of 2-hydroxy-1,5-pentanedinitrile recovered in a yield of 38 per cent and a conversion of 22.5 per cent. The monoacetate of 2-hydroxy-1,5-pentanedinitrile was found to have a refractive index $(n_D^{20})$ of 1.4418 and a density $(d_4^{20})$ of 1.130. The following results were obtained upon analysis of this particular sample of the compound:

|  | Found | Calculated |
|---|---|---|
| Per cent C | 55.19; 55.44 | 55.29 |
| Per cent H | 5.37; 5.45 | 5.30 |
| Per cent N | 18.2; 18.2 | 18.41 |

Example II

A mixture of 79 parts of 1,3-diacetoxypropene and 65 parts of potassium cyanide was heated at 105° C. for one hour. The mixture then was heated to 110° C., since in this particular instance the lower the temperature did not serve to initiate the reaction. At the higher temperature an exothermic reaction commenced. The mixture was stirred vigorously and cooled in an ice bath. After one hour, when the temperature of the mixture had been reduced to room temperature, the mixture was extracted with chloroform. Upon fractional distillation of the extract, the following fractions were collected after removal of the chloroform:

A. Forecut, largely 1,3-diacetoxypropene; 28 parts.
B. Fraction distilling 112° C. to 114° C. under a pressure of 0.12 millimeters of mercury, refractive index $(n_D^{20})$ 1.440; 11.3 parts.

On the further basis of its elemental analyses and its infra-red adsorption spectrum, fraction B was identified as the acetate of 2-hydroxy-1,5-pentanedinitrile.

In a similar manner, other esters of 2-hydroxy-1,5-pentanedinitrile may be prepared from esters of 2-propene-1,1-diol and of propene-1,3-diol. Likewise, esters of 2-hydroxy-3-methyl-1,5-pentanedinitrile may be prepared from esters of 2-methyl-2-propene-1,1-diol and of 2-methylpropene-1,3-diol, and esters of 2-hydroxy-4-methyl-1,5-pentanedinitrile may be prepared from esters of 2-butene-1,1-diol and of 2-butene-1,3-diol. Other esters of 2-hydroxy-1,5-alkanedinitriles also may be prepared in a similar manner. It thus will be apparent and understood that numerous specific embodiments are possible within the generic aspects of the present invention without exceeding the letter and the spirit of the invention as it is defined in the appended claims.

We claim as our invention:

1. An ester of a lower aliphatic monocarboxylic acid with 2-hydroxy-1,5-pentanedinitrile.
2. 2-acetoxy-1,5-pentanedinitrile.
3. The method of preparing 2-acetoxy-1,5-pentanedinitrile which comprises mixing 1,1-diacetoxy-2-propene with about 4 molar equivalents of potassium cyanide, heating the mixture to about 110° C. whereby reaction is initiated and maintaining the mixture during reaction within the range of substantially 110° C. to 120° C., and then separating 2-acetoxy-1,5-pentanedinitrile from the mixture.
4. The method of preparing 2-acetoxy-1,5-pentanedinitrile which comprises mixing potassium cyanide with 1,3-diacetoxypropene in substantially equimolar amounts, heating the mixture to about 110° C. whereby reaction is initiated, and after the reaction has subsided separating 2-acetoxy-1,5-pentanedinitrile from the resulting mixture.
5. The method of preparing 2-acetoxy-1,5-pentanedinitrile which comprises reacting at a temperature between about 50° C. and 200° C. an alkali metal cyanide with 1,1-diacetoxy-2-propene in the presence of an excess of the alkali metal cyanide based on the 1,1-diacetoxy-2-propene.
6. The method of preparing a lower aliphatic monocarboxylic acid ester of 2-hydroxy-1,5-pentanedinitrile which comprises reacting potassium cyanide present in excess with a lower aliphatic monocarboxylic acid diester of 2-propene-1,1-diol at a reaction temperature between about 50° C. and 200° C., whereby there is produced said lower aliphatic monocarboxylic acid ester of 2-hydroxy-1,5-pentanedinitrile.

7. The method of preparing 2-acetoxy-1,5-pentanedinitrile which comprises mixing from about 1/5 to about 20 moles of an alkali cyanide with 1,3-diacetoxypropene, maintaining the mixture at a temperature between about 50° C. and 200° C. at which heat is generated therein, and recovering 2-acetoxy-1,5-pentanedinitrile from the resulting mixture.

8. The method of preparing an aliphatic monocarboxylic acid ester of a 2-hydroxy-1,5-alkanedinitrile which comprises reacting an alkali cyanide with an aliphatic monocarboxylic acid diester of a lower 2-alkene-1,1-diol in the presence of an excess of the alkali cyanide at a reaction temperature between about 50° C. and about 200° C.

9. The method of preparing a lower aliphatic monocarboxylic acid ester of a 2-hydroxy-1,5-alkanedinitrile which comprises reacting an alkali cyanide with a lower aliphatic monocarboxylic acid diester of a lower 2-alkene-1,3-diol, the reactants being initially present in a mole ratio of from about 1/5 to about 20/1, the reaction being effected at temperatures between about 50° C. and about 200° C. at which heat is generated in the reaction mixture.

10. The method of preparing an aliphatic monocarboxylic acid ester of a 2-hydroxy-1,5-alkanedinitrile which comprises reacting an alkali cyanide with an aliphatic monocarboxylic acid diester of a lower 2-alkene-1,1-diol, said reactants being initially present in a mole ratio of from about 1/5 to about 20/1, at a reaction temperature between about 50° C. and about 200° C., whereby there is produced said aliphatic monocarboxylic acid ester of a 2-hydroxy-1,5-alkanedinitrile.

11. The method of preparing an ester of a monohydroxy dinitrile which comprises reacting at a temperature between about 50° C. and about 200° C. at which heat is generated in the reaction mixture an alkali cyanide with an aliphatic monocarboxylic acid diester of a lower aliphatic monoolefinic dihydric alcohol selected from the class consisting of lower 2-alkene-1,1-diols and lower 2-alkene-1,3-diols.

CURTIS W. SMITH.
SEAVER A. BALLARD.

REFERENCES CITED

The following references are of record in the file of this patent:

UNITED STATES PATENTS

| Number | Name | Date |
|---|---|---|
| 2,379,297 | Harmon et al. | June 26, 1945 |
| 2,397,341 | Ellingboe | Mar. 26, 1946 |

OTHER REFERENCES

Pechmann et al., Ber. Deut. Chem., vol. 24, page 3250 (1891).

Lapworth, J. Chem. Soc. (London), vol. 85, page 1223 (1904).